(12) United States Patent
Takahashi et al.

(10) Patent No.: US 6,205,287 B1
(45) Date of Patent: *Mar. 20, 2001

(54) IMAGE FORMING APPARATUS AND SYSTEM FOR CHANGING A PARAMETER VALUE OF A PLURALITY OF IMAGES BY A PREDETERMINED AMOUNT

(75) Inventors: Koji Takahashi, Chigasaki; Toshihiro Yagisawa, Yokohama; Yoshinori Abe, Tama; Atsushi Suzuki, Tokyo, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/591,721

(22) Filed: Jan. 25, 1996

(30) Foreign Application Priority Data

Jan. 26, 1995 (JP) ...................................................... 7-010678

(51) Int. Cl.$^7$ ...................................................... H04N 7/26
(52) U.S. Cl. ............................................. 386/111; 386/46
(58) Field of Search .................................. 386/4, 6, 7, 8, 386/33, 46, 52, 64, 68, 111, 117; 360/15, 27, 8; 358/527, 528, 442

(56) References Cited

U.S. PATENT DOCUMENTS

| | | | |
|---|---|---|---|
| 5,010,498 | * 4/1991 | Miyata | 364/519 |
| 5,353,062 | * 10/1994 | Maeda | 348/412 |
| 5,440,345 | * 8/1995 | Shimoda | 348/411 |
| 5,485,554 | * 1/1996 | Lowitz et al. | 395/116 |
| 5,500,743 | * 3/1996 | Sakaegi et al. | 358/403 |
| 5,727,113 | * 3/1998 | Shimoda | 386/111 |
| 5,864,647 | * 1/1999 | Takeuchi et al. | 386/68 |

* cited by examiner

*Primary Examiner*—Wendy Garber
*Assistant Examiner*—Aung S. Moe
(74) *Attorney, Agent, or Firm*—Fitzpatrick, Cella, Harper & Scinto

(57) ABSTRACT

An image forming apparatus includes a supplier for supplying moving image data obtained by selectively encoding an original image signal using intraframe encoding and interframe encoding. Also provided is a memory for storing the moving image data and an extractor for extracting intraframe encoded image data from the moving image data. The apparatus also includes an instructor unit for instructing the memory to store the extracted image data and a controller for controlling the memory so as to store the image data extracted by the extractor in a predetermined time period in response to an instruction from the instructor.

38 Claims, 12 Drawing Sheets

IMAGE FORMING APPARATUS AND SYSTEM FOR CHANGING A PARAMETER VALUE OF A PLURALITY OF IMAGES BY A PREDETERMINED AMOUNT

BACKGROUND OF THE INVENTION

1. Field of the Invention

This invention relates to an image forming apparatus and system, and more particularly, to an apparatus and system for forming color images.

2. Description of the Related Art

Apparatuses or systems for performing color printing from dynamic-image information, such as a video signal or the like, are known. A description will now be provided of a system for performing color printing by inputting a dynamic image from a VCR (video cassette recorder), serving as a dynamic-image-information reproducing apparatus, with reference to FIG. 1.

In FIG. 1, a video signal reproduced by a VCR 1101 is input to an input terminal 1104 of a video printer 1102, is then transmitted to an A/D (analog-to-digital) converter 1105 and to an output terminal 1108, and is output to a monitor 1103 via the output terminal 1108. The operator instructs the apparatus to accept an image of a desired picture frame by operating an operation unit 1110 when the desired picture frame has been reproduced while confirming reproduced images displayed on the monitor 1103.

A control unit 1111 which has received the instruction to accept the image from the operation unit 1110 outputs a control signal to a memory control circuit 1109, so that an input video signal representing one picture frame converted into a digital signal by the A/D converter 1005 is stored in a memory 1106.

Upon completion of storage of the video signal in the memory 1106, the operator instructs printing of the image by operating the operation unit 1110.

The control unit 1111 which has received the printing instruction from the operation unit 1110 controls the memory control circuit 1109 and a printing unit 1112, so that the video signal representing one picture frame stored in the memory 1106 is read out thereof, is converted into an analog signal by a D/A (digital-to-analog) converter 1107, and is output to the printing unit 1112, which outputs a color print.

In such a video printer, however, it is very difficult to complete the processing of extracting a picture frame to be printed from a video signal, which is a dynamic image signal, by a single operation with a good timing.

In addition, it is difficult to exactly reproduce the luminance or the color of a portion of a picture frame confirmed on the monitor in an obtained print.

SUMMARY OF THE INVENTION

The present invention has been made in consideration of the above-described problems.

It is an object of the present invention to provide an image forming apparatus and system which can easily and exactly perform processing of extracting a desired picture frame from dynamic images, and which can easily adjust the picture quality by easily comparing and confirming the state of a picture frame displayed on a monitor and the state of a picture frame in an actual print.

According to one aspect, the present invention which achieves the above-described objective relates to an image forming apparatus comprising supply means, memory means, extraction means, instruction means, and memory control means. The supply means supplies moving image data obtained by selectively encoding an original image signal using intraframe encoding and interframe encoding. The memory means stores the moving image data supplied by the supply means. The extraction means extracts image data from the moving image data supplied by the supply means which has been intraframe encoded. The instruction means instructs the memory means to store the extracted image data. The memory control means controls the memory means so as to store the image data extracted by the extraction means in a predetermined time period in response to an instruction from the instruction means.

According to another aspect, the present invention which achieves the above-described objective comprises an image forming apparatus comprising memory means, processing means, recording means, and control means. The memory means stores moving image data representing a plurality of picture frames encoded using intraframe encoding within the moving image data which has been selectively encoded using intraframe encoding and interframe encoding. The processing means performs predetermined processing of the moving image data read out from the memory means. The recording means records an image represented by the moving image data output from the processing means on a recording medium. The control means controls the processing means and the recording means so as to record a plurality of images represented by the moving image data processed by the processing means with different parameter values.

According to still another aspect, the present invention which achieves this objective relates to an image forming system comprising a reproducing apparatus, an interface apparatus, and an image forming apparatus. The reproducing apparatus reproduces moving image data selectively encoded using intraframe encoding and interframe encoding from a recording medium.

The interface apparatus comprises means for inputting moving image data reproduced by the reproducing apparatus, memory means for storing the input moving image data, extraction means for extracting image data from the input moving image data which has been intraframe encoded, instruction means for instructing the memory means to store a predetermined picture frame of the extracted moving image data, and memory control means for controlling the memory means so as to store image data representing a plurality of picture frames extracted by the extraction means in a predetermined time period including the predetermined picture frame in the memory means in response to an instruction from the instruction means.

The image forming apparatus comprises means for inputting the moving image data read out from the memory means, processing means for performing predetermined processing of the moving image data read out from the memory means, recording means for recording an image represented by the moving image data output from the processing means on a recording medium, and control means for controlling the processing means and the recording means so as to record a plurality of images represented by the moving image data representing the plurality of picture frames stored in the memory means on one recording medium, and to process the plurality of respective images with different parameter values.

According to still another aspect, the present invention which achieves this objective relates to an image processing apparatus comprising input means, memory means, extraction means, instruction means, memory control means, decoding means, and output means. The input means inputs moving image data obtained by selectively encoding an original image signal selectively using intraframe encoding and interframe encoding. The memory means stores the moving image data. The extraction means extracts intraframe encoded image data from the input moving image data. The instruction means instructs the memory means to store the extracted intraframe encoded data. The memory control means controls the memory means so as to store the intraframe encoded image data extracted by the extraction means in a predetermined time period in response to an instruction from the instruction means. The decoding means decodes the extracted intraframe encoded image data read out from the memory means. The output means outputs the decoded image data decoded by the decoding means.

The foregoing and other objects, advantages and features of the present invention will become more apparent from the following detailed description of the preferred embodiments taken in conjunction with the accompanying drawings.

DETAILED DESCRIPTION OF THE PREFERRED EMBODIMENTS

Preferred embodiments of the present invention will now be described in detail with reference to the drawings.

Figure 1:
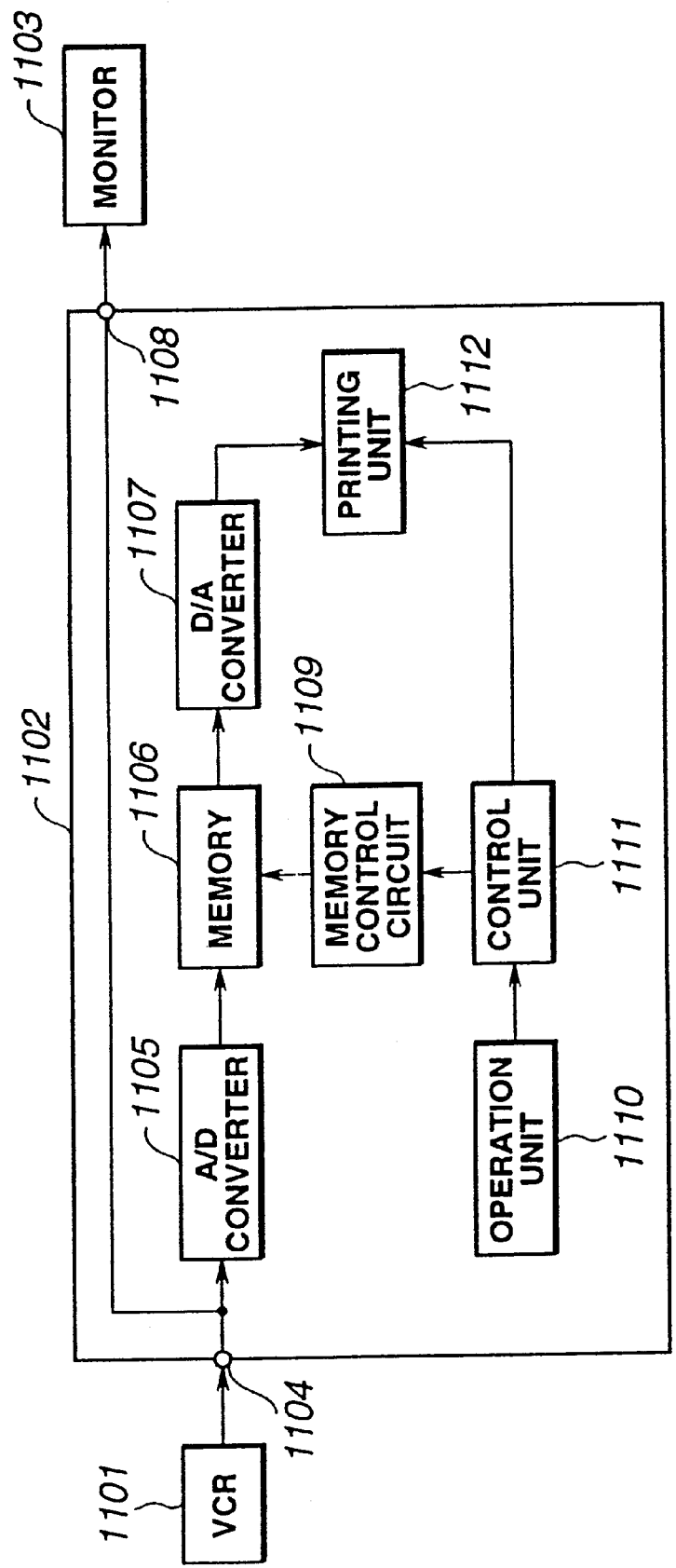
FIG. 1 is a block diagram illustrating the configuration of a conventional system.
Figure 2:
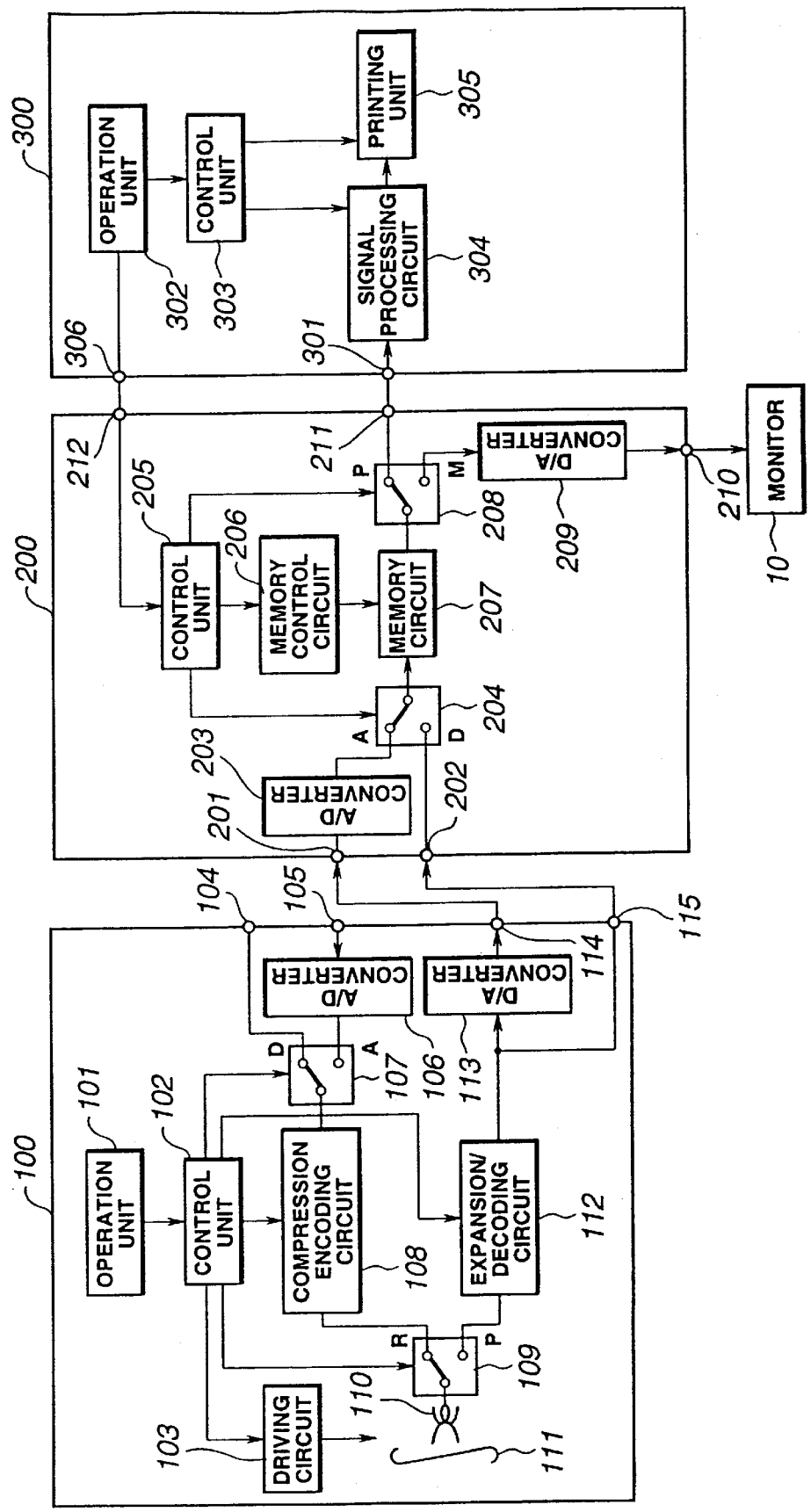
FIG. 2 is a block diagram illustrating the configuration of an image forming system according to a first embodiment of the present invention.

FIG. 2 is a block diagram illustrating the configuration of a color image forming system according to a first embodiment of the present invention. In the first embodiment, a description will be provided of a case in which a digital VCR is used as an input source for dynamic images.

In FIG. 2, a digital VCR 100 records and reproduces a video signal in the form of a digital signal. An interface unit (hereinafter abbreviated as an I/F unit) 200 outputs the reproduced video signal from the VCR 100 to a printer 300, which is a color printer for printing images. Any color image forming apparatus, such as a color copier or the like, may be used as the printer 300.

In such a configuration, the operator first instructs a normal reproducing operation to be performed through an operation unit 101 of the VCR 100. Upon reception of this instruction, a control unit 102 controls a driving circuit 103 to convey a tape 111 and to reproduce the recorded digital image signal using a head 110. Although other signals than the image signal, such as a voice signal and the like, are also recorded on the tape 111, a description will be provided of only the image signal, and the description of the other signals will be omitted.

The reproduced digital image signal is output to an expansion/decoding circuit 112 via a P side or P contact of a switch 109. The expansion/decoding circuit 112 performs expansion processing corresponding to processing in a recording operation, and outputs the resultant signal to a D/A converter 113 and to a digital output terminal 115. The image signal input to the D/A converter 113 is converted into an analog signal, which is output to an analog output terminal 114. The image signals output to the output terminals 114 and 115 are input to the I/F unit 200 via input terminals 201 and 202, respectively, of the I/F unit 200.

The analog image signal input to the analog input terminal 201 is converted into a digital signal by an A/D converter 203, and is transmitted to a switch 204. The switch 204 is switched to the A terminal when the VCR 100 outputs an analog signal at terminal 114 and is switched to the D terminal when the VCR 100 outputs a digital signal at terminal 115. The switching 204 outputs a digital image signal to a memory circuit 207.

Figure 3:
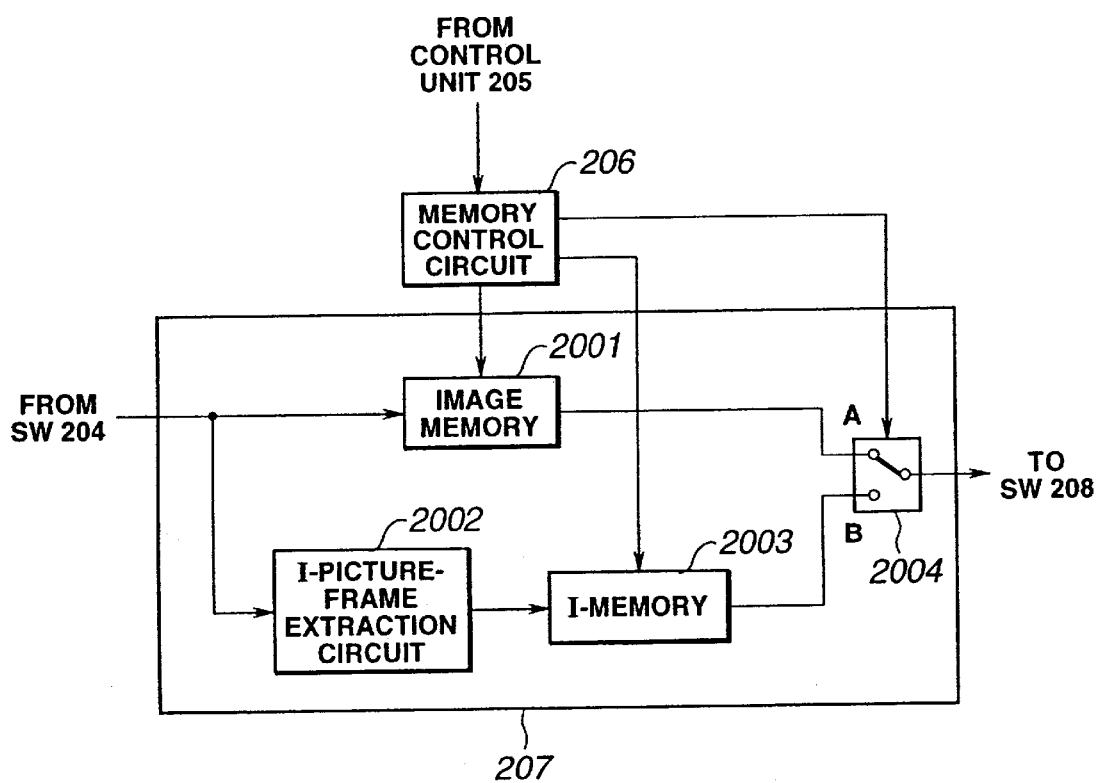
FIG. 3 is a block diagram illustrating the configuration of a memory circuit and the surrounding structure shown in FIG. 2.

FIG. 3 illustrates a detailed configuration of the memory circuit 207 and a memory control circuit 206.

In FIG. 3, the image signal output from the switch 204 is output to an image memory 2001 and to an I-picture-frame extraction circuit 2002. The image memory 2001 stores an image signal representing all of I, P- and B-picture frames (to be described later), and outputs the input image signal by delaying it so as to be synchronized with an image signal output from an I-memory 2003 (to be described below).

The I-picture-frame extraction circuit 2002 extracts only an image signal representing I-picture frame (picture frames subjected to intraframe encoding) (to be described later) from the input image signal using an identifying signal or the like added to the reproduced image signal, and outputs the extracted image signal to the I-memory 2003. The I-memory 2003 stores an image signal representing the I-picture frames extracted by the I-picture-frame extraction circuit 2002, and has a capacity for storing 25 I-picture frames.

The memory control circuit 206 controls writing and reading operations of an image signal by controlling the image memory 2001 and the I-memory 2003. The delay time of the image memory 2001 is set so as to output an image signal representing an I-picture frame which is the thirteenth frame both from the leading and trailing frames of 25 I-picture frames.

The memory control circuit 206 also controls the switch 2004 so as to connect its armature to an A side when monitoring the reproduced image and to a B side when performing a printing operation, in response to a control signal from the control unit 205.

That is, all of I-, P- and B-picture frames (as will be described later, P- and B-picture frames are picture frames subjected to interframe encoding) are reproduced in the form of image signals for monitoring, and only an image signal representing 25 I-picture frames is output as an image signal for printing.

Although in the present embodiment, memories capable of controlling write and read addresses, such as ROM's (read-only memories) or the like, are used for the memory circuit 207, FIFO (first-in first-out) memories may also be used. In such a case, operations similar to the above-described operations can be performed by providing two reading ports, and using one of the ports as a port for reading the first image signal which has been written, and using another port as a port for outputting an image signal from a position corresponding to the above-described central picture frame.

An image signal for monitoring output from the memory circuit 207 is output to a D/A converter 209 via an M side of a switch 208, and is converted into an analog signal. The obtained analog signal is output to a monitor 10 via an output terminal 210 for monitoring, and an image corresponding to the reproduced image signal is displayed. When the signal input from the VCR 100 is a digital image signal, it is also possible to obtain an image signal for monitoring from the analog output terminal 114 of the VCR 100. Also when the signal input from the VCR 100 is an analog signal, it is possible to obtain an image signal for monitoring from the digital output terminal 115 of the VCR 100 if the monitor 10 can deal with a digital input signal. In this case, the A/D converter 203 becomes unnecessary.

The operator instructs the I/F unit 200 to accept an image by operating an operation unit 302 of the printer 300 when the desired image is reproduced while confirming images displayed on the monitor 10. Upon reception of instruction to accept the image, the control unit 205 of the I/F unit 200 controls the memory control circuit 206 to interrupt writing of an image signal in the memory circuit 207. Accordingly, at that time, an image signal representing 25 I-picture frames, comprising respective 12 picture frames before and after an I-picture frame immediately before the picture frame whose acceptance has been instructed by the operator and the concerned I-picture frame, is stored in the I-memory 2003 of the memory circuit 207.

Upon completion of an operation to extract the picture frame, the operator instructs the performing of printing by setting parameters (hereinafter termed "sample printing") through the operation unit 302. Upon reception of this instruction, the control unit 205 of the I/F unit 200 connects the armature of the switch 208 to a P side, and controls the memory control circuit 206 so that image signals representing 25 I-picture frames stored in the I-memory 2003 are sequentially read from the oldest signal, and the read signal are output to the printer 300 via the switch 208 and an output terminal 211.

A signal processing circuit 304 of the printer 300 performs predetermined processing necessary for printing for the image signals output from the I/F unit 200, and then outputs the resulting signals to a printing unit 305 by reducing the size of each picture frame. The printing unit 305 prints images of 25 picture frames output from the signal processing circuit 304 on a single sheet of recording paper in the format of five picture frames both in the vertical and horizontal directions. At that time, the signal processing circuit 304 outputs image signals representing respective picture frames while changing two kinds of parameters relating to signal processing by a predetermined amount for each of the 25 picture frames. The two kinds of parameters can be selected from among a plurality of adjustable parameters through the operation unit 302 in signal processing relating to the picture quality, such as the hue, the color density and the like, and are determined in advance by the operator by operating the operation unit 302 before performing sample printing.

Figure 4:
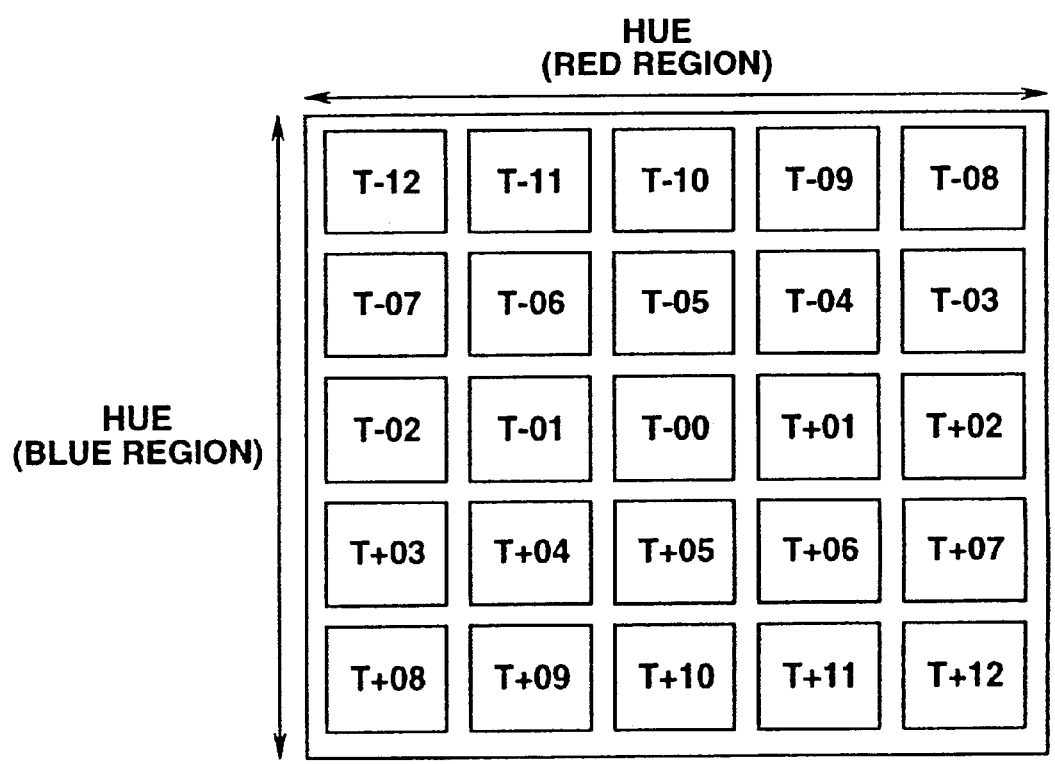
FIG. 4 is a schematic diagram illustrating sample prints in the first embodiment.

In an actual printing operation, one kind of parameter is set for each of the ordinate and the abscissa on a single sheet of recording paper, and printing is performed by changing the values of parameters for each picture frame. Since five picture frames are printed in each of the vertical and horizontal directions, images having five different parameter values can be represented in each of the ordinate and the abscissa. In the present embodiment, parameters relating to the hues of a red region are set in the abscissa, parameters relating to the hues of a blue region are set in the ordinate, and images in which parameter values are changed for each parameter group are printed. That is, images obtained by shifting the hue by a predetermined amount before and after red (R) are printed in the abscissa, and images obtained by shifting the hue by a predetermined amount before and after blue (B) are printed in the ordinate. FIG. 4 illustrates the result of such sample printing. A description will now be provided of the correspondence between the layout of images shown in FIG. 4 and respective images in the direction of the time base shown in FIG. 5, with reference to FIG. 5.

Figure 5:
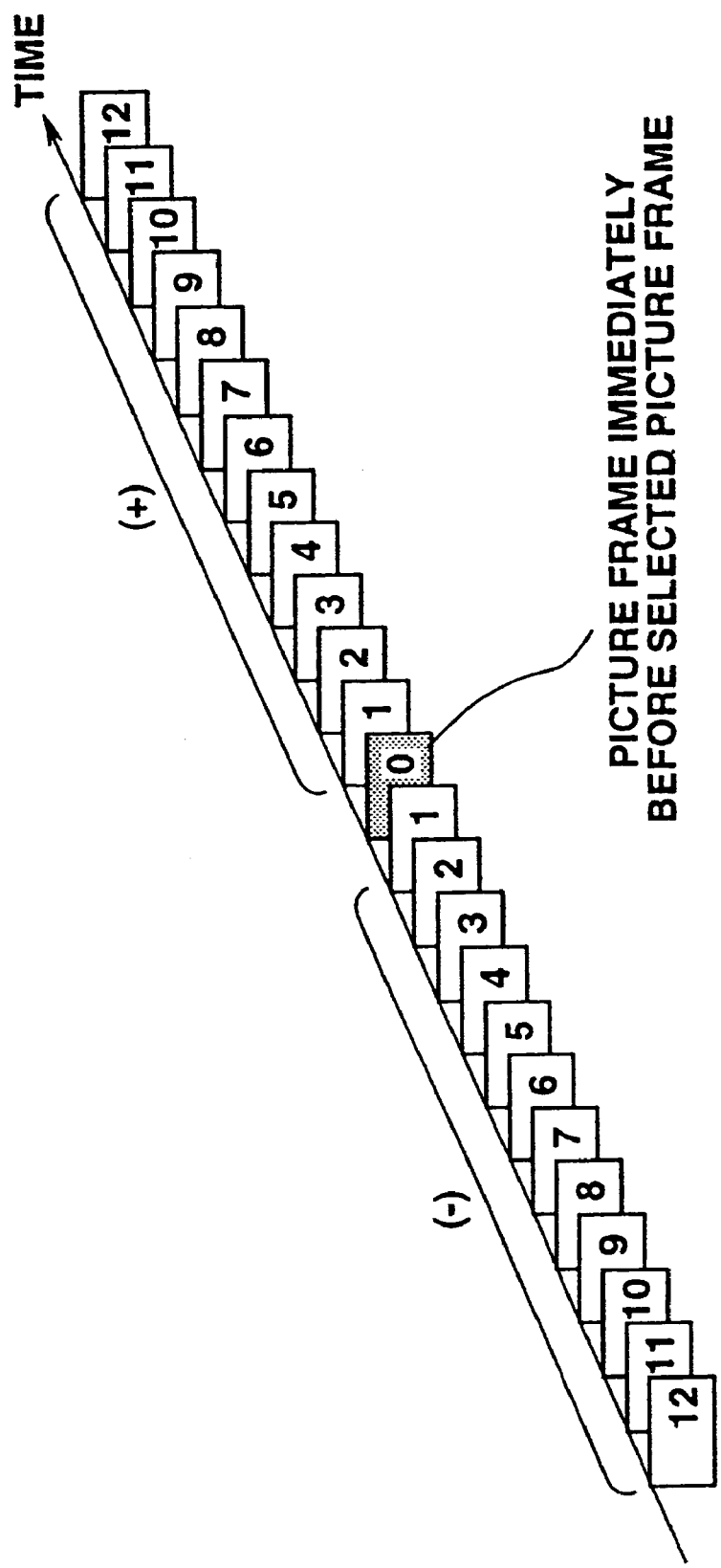
FIG. 5 is a diagram illustrating the correspondence between images within a memory and printed images in the first embodiment.

In FIG. 5, a picture frame having reference numeral 00 represents the picture frame displayed on the monitor 10 when the operator has instructed the apparatus to accept the image. As described above, image signals representing 12 picture frames before and after the picture frame 00 and the picture frame 00 are stored in the I-memory 2003. That is, picture frames up to the 12th picture frame in the + direction of the time base and picture frames up to the 12th picture frame in the − direction of the time base and the concerned picture frame 00 shown in FIG. 5 are stored in the I-memory 2003. Reference numerals of images shown in FIG. 4 represent images from the −12th image to the +12th image shown in FIG. 5.

Next, a description will be provided of an image which is actually printed based on such sample printing, and an operation of selecting parameter values when printing the image.

First, a description will be provided of the operations performed when selecting an image to be actually printed from 25 picture frames during sampling printing. In such a case, the operator sets the apparatus in a picture-frame selection mode through the operation unit 302. Thereafter, a picture frame which is considered to have the optimum timing is selected from among the 25 picture frames, and the number (between +12 and −12) of the selected picture frame is input to the operation unit 302 using an input key (not shown), such as a ten-digit keypad or the like.

Upon completion of selection of the picture frame to be printed, the operator sets the apparatus in a parameter-value selection mode through the operation unit 302. The number of a picture frame having desired hues is also input using the input key.

According to the above-described series of selection operations, it is possible to extract a still image having the optimum timing, and to easily determine desired parameter values. By printing the selected image based on the determined parameter values, it is possible to print the most suitable picture frame with the desired picture quality.

Since images corresponding to a plurality of picture frames processed according to different parameter values at different times are recorded on a single sheet of recording paper, it is possible to complete an operation of selecting an image to be printed and selection of desired parameter values, i.e., adjustment of the picture quality, by a printing operation on a single sheet, and thereby to reduce the number of sheets of recording paper that are used.

Although in the present embodiment, the number of picture frames printed during a sample printing is the same in the vertical and horizontal directions, it is not always necessary to have the same number in the vertical and horizontal directions; different numbers may be adopted in accordance with the width of adjustment of the selected parameters. For example, as shown in FIG. 4, when adopting red-region hues and blue-region hues as parameters on the abscissa and the ordinate, respectively, and finer adjustment is required for red-region hues, seven picture frames may be displayed along the abscissa in order to widen the width of hue adjustment in the red region. In such a case, operations identical to the above-described ones may be performed by increasing the capacity of the I-memory 2003 so that images corresponding to 7×5=35 picture frames can be stored. However, when the number of picture frames increases, it is necessary to change the size of each picture frame in accordance with the number of picture frames, so that all the picture frames can be printed on one sheet of recording paper.

Next, a description will be provided of recording and reproducing operations, a compression/encoding operation, and an expansion/decoding operation of the VCR 100.

First, in a recording operation, an image signal input into the VCR 100 from an analog input terminal 105 and converted into a digital signal by the A/D converter 106, or a digital image signal input into the VCR 100 from a digital input terminal 104 is transmitted to a compression/encoding circuit 108 via a switch 107. Thus, when a digital signal is input from terminal 104, the switch 107 is switched to its D terminal. When an analog signal is input from terminal 105, the switch 107 is switched to its A terminal. The switch 107 is controlled by the control unit 102. The image signal whose quantity of information has been compressed by the compression/encoding circuit 108 is transmitted to the head 110 via an R terminal of the switch 109 under control of the control unit 102, and is recorded on the tape 111.

A reproducing operation is performed in the above-described manner.

In the present embodiment, the compression/encoding circuit 108 and the expansion/decoding circuit 112 perform encoding and decoding, respectively, conforming to the MPEG (Moving Picture coding Experts Group). A description will now be provided of encoding and decoding according to the MPEG.

MPEG data conforms to international standards for high-efficiency encoding of dynamic images, and is subjected to high-efficiency encoding utilizing frequency characteristics of the data, visual characteristics of a man, and redundancy in the direction of the time base.

That is, the MPEG method comprises MPEG1, having a maximum transfer rate of 1.5 Mbps (megabits per second), to be used for digital storage media, and MPEG2, having no upper limit for the transfer rate, to be used for all transmission systems, such as two-way digital multimedia apparatuses, digital VCR's, ATV (advanced television), optical-fiber networks, and the like. However, since the two methods have substantially the same basic algorithm, a description will be provided of only the data structure and the algorithm for encoding/decoding of the MPEG1.

In the MPEG2, an encoding method which can be used is provided using a plurality of profiles (simple profile, main profile, scalable profile, spatially scalable profile, and high profile). However, the typical main profile is substantially the same as in the MPEG1.

First, a description will be provided of the principle of the high-efficiency encoding method according to the MPEG.

In this high-efficiency encoding method, by reducing redundancy in the direction of the time base by obtaining the differences between frames, and by reducing redundancy in the spatial direction by performing a discrete cosine transform operation (hereinafter abbreviated as "DCT") and variable-length-encoding processing of the obtained difference data, high-efficiency encoding is realized.

Redundancy in the direction of the time base can be reduced by paying attention to the high correlation between consecutive frames of dynamic images, and obtaining the difference between a frame to be encoded and the frame preceding or succeeding the concerned frame in the time base.

Figure 6:
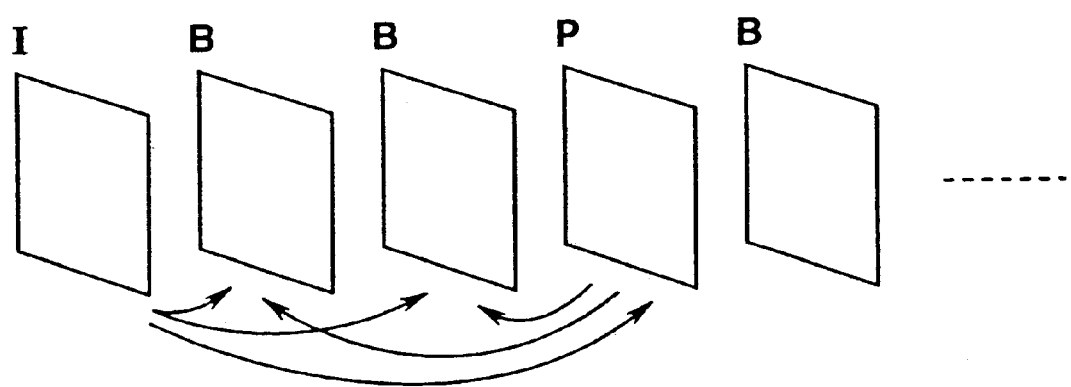
FIGS. 6 and 7 are diagrams illustrating compression and expansion operations in the first embodiment.

Accordingly, in the MPEG, as shown in FIG. 6, in addition to an intraframe encoded image (I-picture) obtained in an encoding mode in which encoding is performed within a frame (picture), interframe encoded images, comprising forward-predictive encoded images (P-pictures) in which the difference value between a frame and the frame preceding the concerned frame in the direction of the time base is encoded, and two-way predictive encoded images (B-pictures), in which the difference value between a frame and the frame preceding or succeeding the concerned frame in the direction of the time base, or one of the difference values between a frame and the frames preceding and succeeding the concerned frame having the smallest value is encoded, are provided. Frames in these encoded modes are combined in a predetermined order.

The MPEG recommends a combination in which one I-picture or frame, four P-pictures or frames and ten B-pictures or frames constitute one unit (GOP (group of pictures)), and the I-picture is placed at the head of the group followed by two B-pictures, one P-picture, two B-pictures, one P-picture, two D pictures, one P-picture, two B-pictures, one P-picture, and two B-pictures. By placing I-pictures at a constant period, it is possible to perform particular reproducing operations, such as a reverse reproducing operation and the like, and a partial reproducing operation in units of the GOP, and to prevent error propagation.

When a new object appears within a frame, the difference between the concerned frame and the frame succeeding the concerned frame in the direction of the time base is, in some cases, smaller than the difference between the concerned frame and the frame preceding the concerned frame in the direction of the time base.

Accordingly, in the MPEG, compression having higher efficiency is performed by performing the above-described two-way predictive encoding.

In the MPEG, motion compensation is also performed.

That is, an input image is divided into units of four blocks (a macroblock), each comprising 8 pixels×8 pixels, for luminance data, and into units of two blocks for color-difference data. The difference between a macroblock corresponding to the preceding or succeeding frame and a macroblock in the vicinity of the concerned macroblock is obtained. A motion vector is detected by searching for a macroblock having the minimum difference value, and encoding is performed using this motion vector.

In a decoding operation, data of a macroblock corresponding to the preceding or succeeding frame is extracted using this motion vector, and encoded data is decoded by motion compensation using the motion vector.

In such motion compensation, the preceding frame in the direction of the time base is first encoded, and is then decoded to provide a preceding frame. Motion compensation is performed using a macroblock corresponding to this frame and a macroblock corresponding to a frame to be encoded.

Motion compensation between frames is performed in the MPEG1 method, and motion compensation between fields if performed in the MPEG 2 method.

Difference data and motion vectors obtained in the above-described motion compensation are further subjected to high-efficiency encoding using DCT, quantization and variable-length encoding.

Next, a description will be provided of the data structure in this MPEG method.

Figure 7:
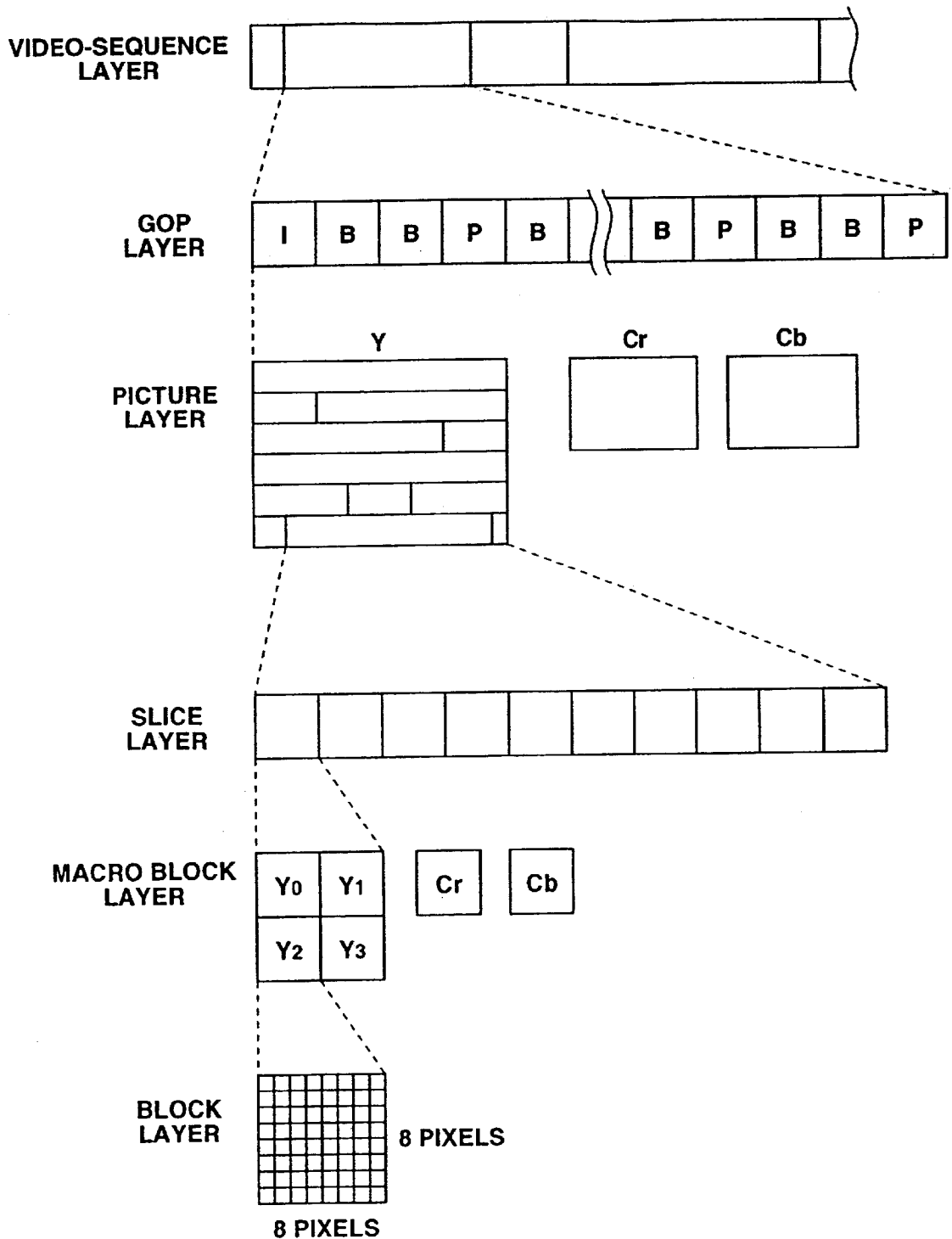

As shown in FIG. 7, this data structure is constituted by a hierarchical structure which comprises a video-sequence layer, a GOP layer, a picture layer, a slice layer, a macroblock layer, and a block layer.

A description will now be provided of the respective layers starting from the lowermost layer.

The block layer comprises 8 pixels×8 pixels for each luminance data and color-difference data, and DCT is performed in units of this layer.

The macroblock layer is constituted by six blocks, each comprising 8 pixels×8 pixels. Four the blocks, Y0, Y1, Y2, and Y3 are the luminance data. Two of the blocks, Cr and Cb, are for color-difference data. One of these blocks includes a macroblock header. In the MPEG method, such a macroblock is used as a unit for motion compensation (to be described later) and encoding. The macroblock header includes data relating to motion compensation and the quantization step in units of each macroblock, and data indicating whether or not six DCT blocks (Y0, Y1, Y2, Y3, Cr and Cb) within each macroblock have data.

The slice layer is constituted by at least one macroblock (consecutive in the order of scanning of an image when constituted by more than one macroblock), and a slice header. The quantization step performed on a series of macroblocks within the same slice layer can be constant. The slice header includes data relating to the quantization step performed within each slice layer. When there is no quantization-step data peculiar to each macroblock, the quantization step within the slice layer is made constant. The leading macroblock of the slice layer resets the difference value of the DC components of the signal represented by the data stored in the slice layer.

The picture layer comprises a plurality of above-described slice layers described above in units of a frame, and is constituted by a header, comprising a picture-start code and the like, and one or a plurality of slice layers which follow. This header includes a code indicating the encoding mode of the image, and a code indicating the accuracy in the detection of the motion of the image (in units of a pixel or a semi-pixel).

The GOP layer is constituted by a header, comprising a group-start code, a time code indicating the time from the start of sequence, and the like, and a plurality of I-frames, B-frames and P-frames which follow. Each frame comprises one picture layer.

The video-sequence layer comprises a plurality of GOP layers and starts from a sequence-start code and ends at a sequence-end code. Control data necessary for decoding, such as the size, the aspect ratio and the like of the image, and the plurality of GOP's having, for example, the same image size are provided between the above-described codes.

The MPEG method generating such a data structure provides a bit stream.

Figure 8:
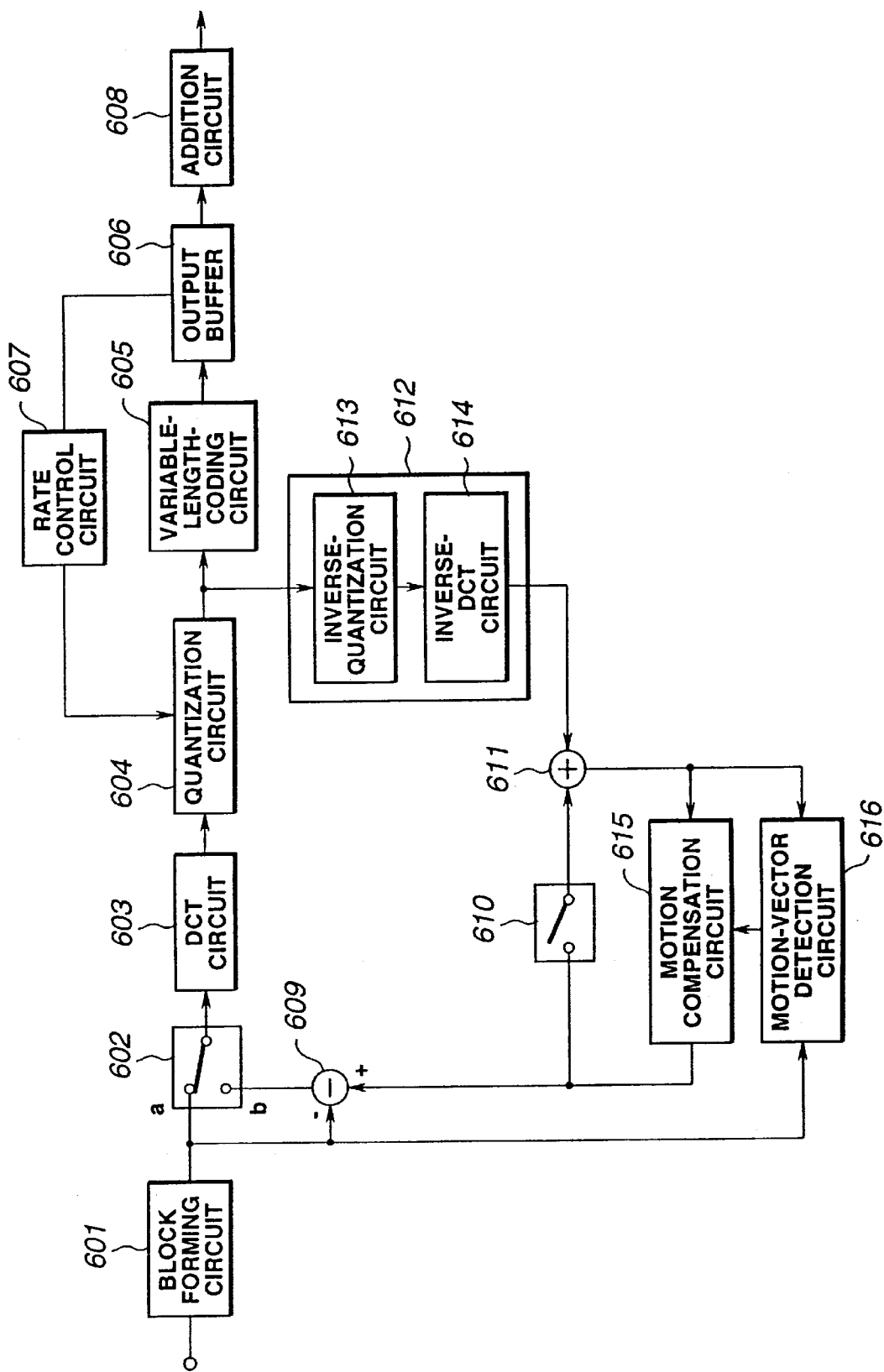
FIG. 8 is a block diagram illustrating the configuration of a compression/encoding circuit in the first embodiment.
Figure 9:
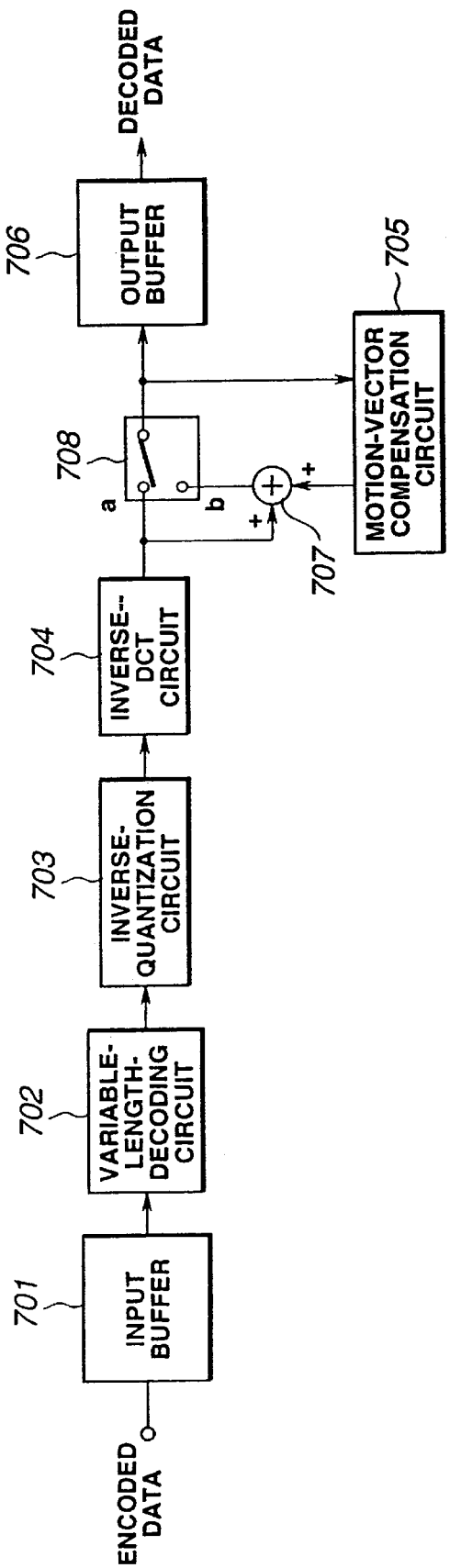
FIG. 9 is a block diagram illustrating the configuration of an expansion/decoding circuit in the first embodiment.

Next, a description will be provided of the configuration of the compression/encoding circuit 108 and the expansion/decoding circuit 112 which deal with the above-described MPEG data, with reference to FIGS. 8 and 9.

First, a description will be provided of the compression/encoding circuit 108. FIG. 8 is a block diagram illustrating the configuration of the compression/encoding circuit 108. As shown in FIG. 8, the compression/encoding circuit 108 includes, for example, a block forming circuit 601, a DCT circuit 603, a quantization (Q) circuit 604, a variable-length-coding (VLC) circuit 605, a motion compensation circuit 615, a motion-vector detection circuit 616, a rate control circuit 607, a local decoding circuit 612, an output buffer 606, and the like.

Figure 10:
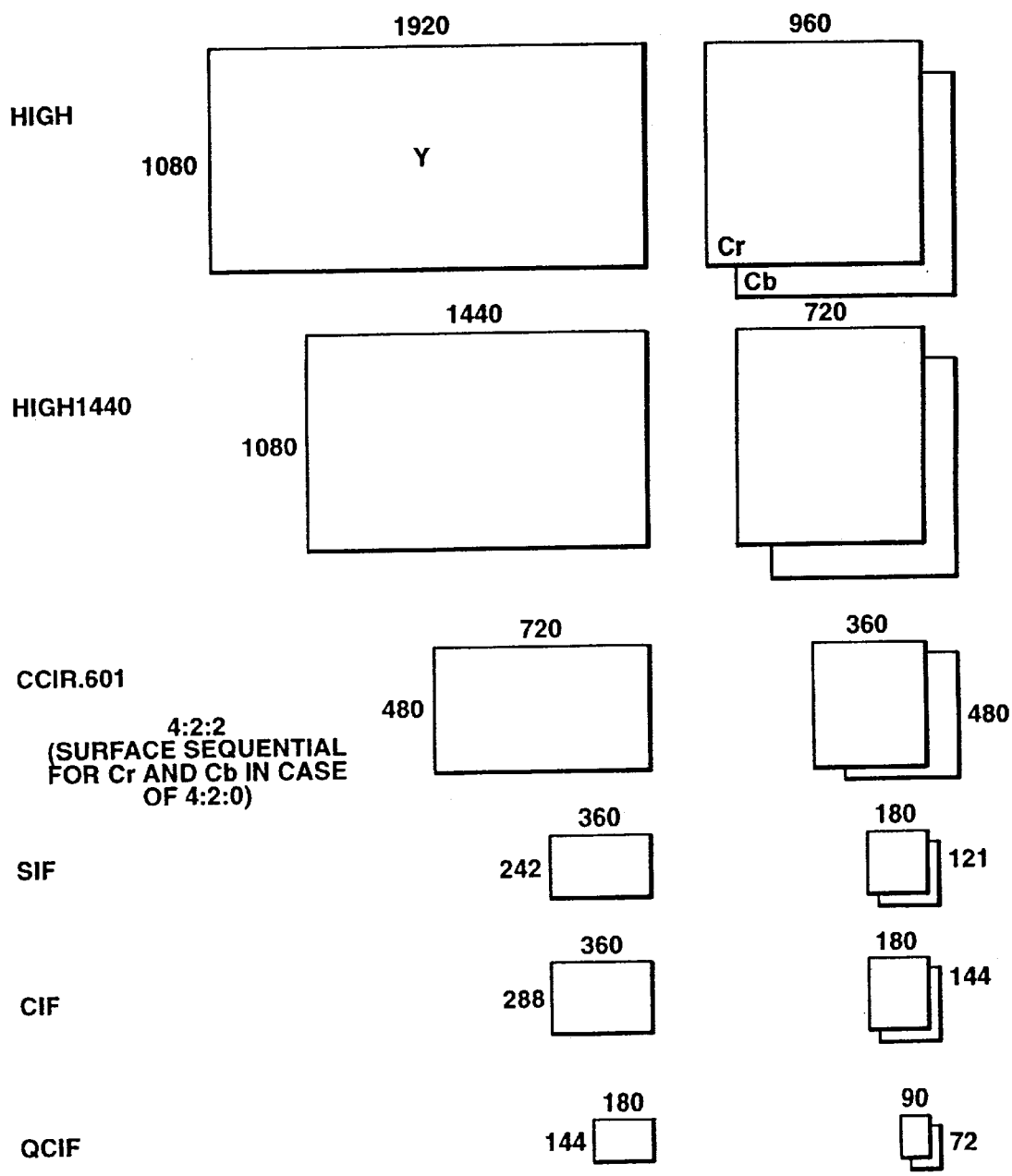
FIG. 10 is a diagram illustrating data dealt with in the first embodiment.

As shown in FIG. 10, the sizes of images to be encoded in the present embodiment correspond to the formats of High, comprising a frame Y of 1920 pixels×1080 pixels and blocks Cr and Cb of 960 pixels×540 pixels (corresponding to the high level in the MPEG2), High 1440, comprising a frame Y of 1440 pixels×1080 pixels and blocks Cr and Cb of 720 pixels×540 pixels (corresponding to the high 1440 level in the MPEG2), an image conforming to CCIR (Comité Consulatif International des Radio-Communications). 601 having an aspect ratio of 4:2:2 or 4:2:0 comprising a frame Y of 720 pixels×480 pixels and blocks Cr and Cb of 360 pixels×480 pixels (corresponding to the main level in the MPEG2), SIF (source input format) comprising a frame Y of 360 pixels×242 pixels and blocks Cr and Cb of 180 pixels×121 pixels, CIF (common intermediate format) comprising a frame Y of 360 pixels×288 pixels and blocks Cr and Cb of 180 pixels×144 pixels, and QCIF (quarter common intermediate format) comprising a frame Y of 180 pixels×144 pixels and blocks Cr and Cb of 90×72 pixels. In the low level of the MPEG1 and MPEG2, the image size corresponding to the format of SIF is dealt with.

In FIG. 8, image data input from the switch 107 shown in FIG. 2 is divided into the above-described blocks, each comprising 8 pixels×8 pixels, by the block forming circuit 601, and is transmitted to the DCT circuit 603 via a switch 602.

The switch 602 is switched depending on whether input image data comprising intraframe (I-frame) data or data of other frames (P-frame or B-frame). The armature of the switch 602 is connected to an "a" contact in the case the input image data is intraframe data, and to a "b" contact in other cases.

In the case of intraframe data, the data in the space region is converted into data in the frequency region according to DCT by the DCT circuit 603. DCT coefficients obtained in such conversion are quantized by the quantization circuit 604. After being subject to variable-length coding by the variable-length-coding circuit 605, the data is first stored in the output buffer 606.

In cases other than intraframe data, the armature of the switch 602 is connected to the b contact and the above-described motion compensation is performed. That is, the input interframe image data from block forming circuit 601 is applied to a subtractor 609 and to a motion-vector detection circuit 616. The motion-vector detection circuit 616 generates a motion vector by comparing frame data to be encoded with predetermined reference frame data and outputs the motion vector to a motion compensation circuit 615, which assigns a macroblock to be output based on the input motion vector. Locally decoded image data provides a macroblock corresponding to a predetermined frame (the preceding frame, the succeeding frame, or a frame interpolated between these frames) by referring to the motion vector detected by the motion-vector detection circuit 616. The output macroblock from the motion compensation circuit 615 is applied to the subtractor 609.

In addition, the output of the motion compensation circuit 615 is applied to a switch 610, which is closed when the switch 602 is closed, e.g., when the input image data from the switch 107 is not intraframe data. The output from the motion compensation circuit 615 is applied, through closed switch 610, to an adder 611, which adds this output to the output from the local decoding circuit 612. The local decoding circuit 612 comprises an inverse-quantization circuit 613, which receives the output from the quantization circuit 604 and an inverse DCT circuit 614 which receives the output from the inverse-quantization circuit 613 and transmits its output to the adder 611. The adder 611 outputs the sum of the outputs of the motion compensation circuit 615 and the inverse-DCT circuit 614 and applies the sum to the motion compensation circuit 615 and to the motion-vector detection circuit 616.

The difference signal output by the subtractor 609 is input to the b contact of the switch 602, which transmits it to the DCT circuit 603 which DCT encodes the signal. The signal is then transmitted to the quantization circuit 604 which quantizes the signal from the DCT circuit 603. The quantized signal is then inputted into the variable-length coding circuit 605 which variable-length-cods the signal and transmits it to an output buffer 606 which stores the signal output from the variable-length-coding circuit 605.

The rate control circuit 607 controls the amount of encoded data by switching the quantization step of the quantization circuit 604 based on the amount of occupation of encoded data in the output buffer 606.

Finally, various kinds of headers as described above are added to the encoded data by an addition circuit 608, and the resultant data is transmitted as MPEG data according to the MPEG method to the R side or contact of the switch 109 and then to the head 110 for recording of the compressed, encoded image data on tape 111.

The expansion/decoding circuit 112 performs processing which is substantially inverse to the above-described compression/encoding processing, and, as shown in FIG. 9, includes an input buffer 701, a variable-length-decoding (VLD) circuit 702, an inverse-quantization (IQ) circuit 703, an inverse-DCT (IDCT) circuit 704, a motion compensation circuit 705, an output buffer 706, and a switch 708.

That is, encoded image data reproduced by the head 110 and input via the switch 109 is stored in the input buffer 701. The encoded data read out from the input buffer 701 is converted into data in the space region corresponding to data before encoding by the variable-length-decoding circuit 702, the inverse-quantization circuit 702 and the inverse-DCT circuit 704.

An adder 707 adds a difference value output from the motion compensation circuit 705 to the output from the inverse-DCT circuit 704. A switch 708 selects one of the output of the inverse-DCT circuit 704 and the output of the adder 707. The switch 708 is switched based on encoding-mode information detected by a data detection circuit (not shown) so that its armature is connected to an "a" side or contact in the case of intraframe data, and to a "b" side or contact in other cases.

The data decoded in the above-described manner is first stored in the output buffer 706, where it has the original pixel arrangement of the image data before it was encoded, and is output to the D/A converter 113 and the digital output terminal 114.

As described above, according to the present embodiment, by storing an image signal representing a plurality of picture frames around a desired picture surface in a memory, and printing the plurality of images on a single sheet of recording paper by changing various parameters, it is possible to easily extract an optimum image when printing an image from among dynamic images, and to perform desired picture-quality adjustment in a single printing operation.

In the present embodiment, since an image signal representing I-picture frames are stored in a memory and is used for sample printing in the above-described manner, an image which is finer than when using other picture frames (P- and B-picture frames) can be obtained. In the case of the above-described GOP structure, an I-picture frame is supplied for every 15 picture frames. Hence, it is possible to select a picture frame to be printed from a wide time range (an interframe interval of 1/30 second×every 15 picture frames×25 picture frames=12.5 seconds), and to select a desired picture frame with high probability.

In the present embodiment, an image signal reproduced by the VCR 100 is decoded and is output to the I/F unit 200. However, the capacity of the memory can be reduced by outputting an image signal, which is compressed and encoded in the above-described manner, in the compressed state.

A description will now be provided of a case, in which reproduced image data compressed in the above-described manner is output to the I/F unit 200 and an image represented by the image data is printed, according to a second embodiment of the present invention.

Figure 11:
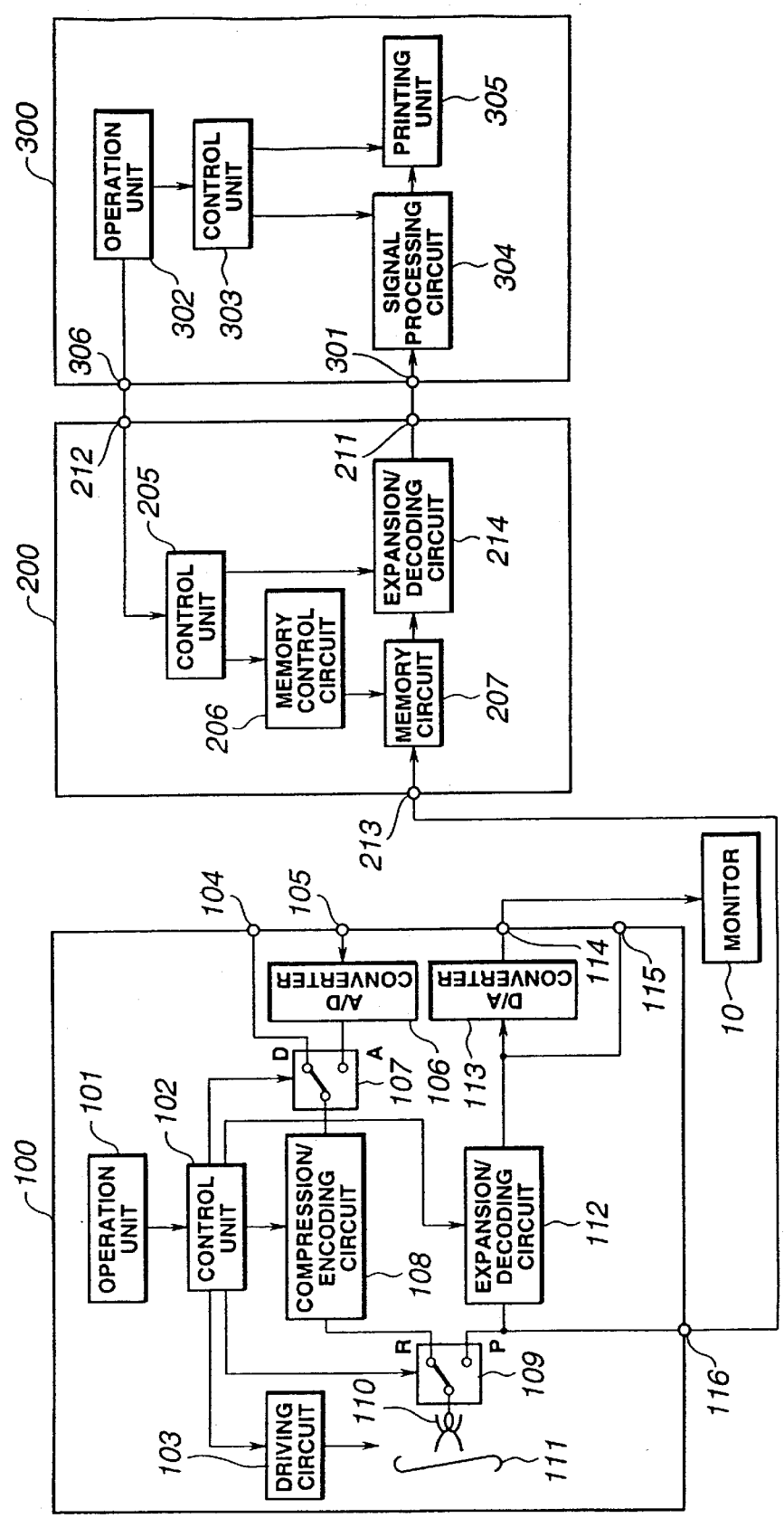
FIG. 11 is a block diagram illustrating the configuration of an image forming system according to a second embodiment of the present invention.

FIG. 11 is a block diagram illustrating the configuration of an image forming system according to the second embodiment. In FIG. 11, the same components as in the first embodiment are indicated by the same reference numerals, and a further description thereof will be omitted.

In FIG. 11, as in the first embodiment, an image signal reproduced by a head 110 is output to an expansion/decoding circuit 112 and to an output terminal 116. In the second embodiment, the compressed/encoded data is output to an I/F unit 200 via the output terminal 116.

The image signal decoded by the expansion/decoding circuit 112 according to the MPEG method in the above-described manner is converted into an analog signal by a D/A converter 113, and is output to a monitor 10 via an analog output terminal 114, and an image corresponding to the reproduced image signal is displayed. Thus, in the second embodiment, the image signal output from the analog output terminal 114 is used as an image signal for monitoring.

The image signal output from the output terminal 116 is transmitted to a memory circuit 207 via the input terminal 213 for compressed data of the I/F unit 200. In the second embodiment, since the image signal input to the memory circuit 207 is compressed data, the capacity of the memory circuit 207 can be much smaller than in the first embodiment.

In the second embodiment, since the image signal is supplied in a compressed state, an operation of extracting I-picture frames is performed using encoded data.

After the image signal has been reproduced by the VCR 100 in the above-described manner, the operator operates an operation unit 302 of a printer 300 when a picture frame to be printed as been reproduced while confirming its appearance on the monitor 10. As in the first embodiment, a control unit 205 of the I/F unit 200 controls a memory control circuit 206 so as to interrupt writing of an image signal in the memory circuit 207. Also in the second embodiment, an image signal representing 25 I-picture frames around an I-picture frame immediately before a picture frame whose acceptance has been instructed by the operator are stored in the memory 2003.

In the second embodiment, the I/F unit 200 also includes an expansion/decoding circuit 214, which performs the same operation as the expansion/decoding circuit 112 of the VCR 100. That is, upon completion of acceptance of the image signal in the memory circuit 207, the operator instructs sample printing through the operation unit 302, and selects the above-described two kinds of parameters for performing sample printing. Upon reception of the instruction for sample printing, the control unit 205 reads out the compressed and encoded image signal from the memory circuit 207. The read out compressed and encoded data is returned to its original state according to the above-described decoding processing by the expansion/decoding circuit 214, and is output to the printer 300 via an output terminal 211 which is connected to the input terminal 301 of the printer 300.

Sample printing and the process of printing a selected image which follow the above-described processing are the same as in the first embodiment.

As described above, according to the second embodiment, by also providing the expansion/decoding circuit 214 in the I/F unit 200, the capacity of the respective memories of the memory circuit 207 of the I/F unit 200 can be greatly reduced.

By this arrangement, it is also possible to reduce the transfer rate between the VCR 100 and the I/F unit 200, and to reduce the burden on the I/F unit 200 including the expansion/decoding circuit 214.

In any of the first and second embodiments, since the I/F unit 200 includes a memory and/or an expansion/decoding circuit, even a printer which does not have such devices can print an image from a dynamic image signal.

Next, a description will be provided of a third embodiment of the present invention. In the third embodiment, a memory and an expansion/decoding circuit are provided within the printer 300.

Figure 12:
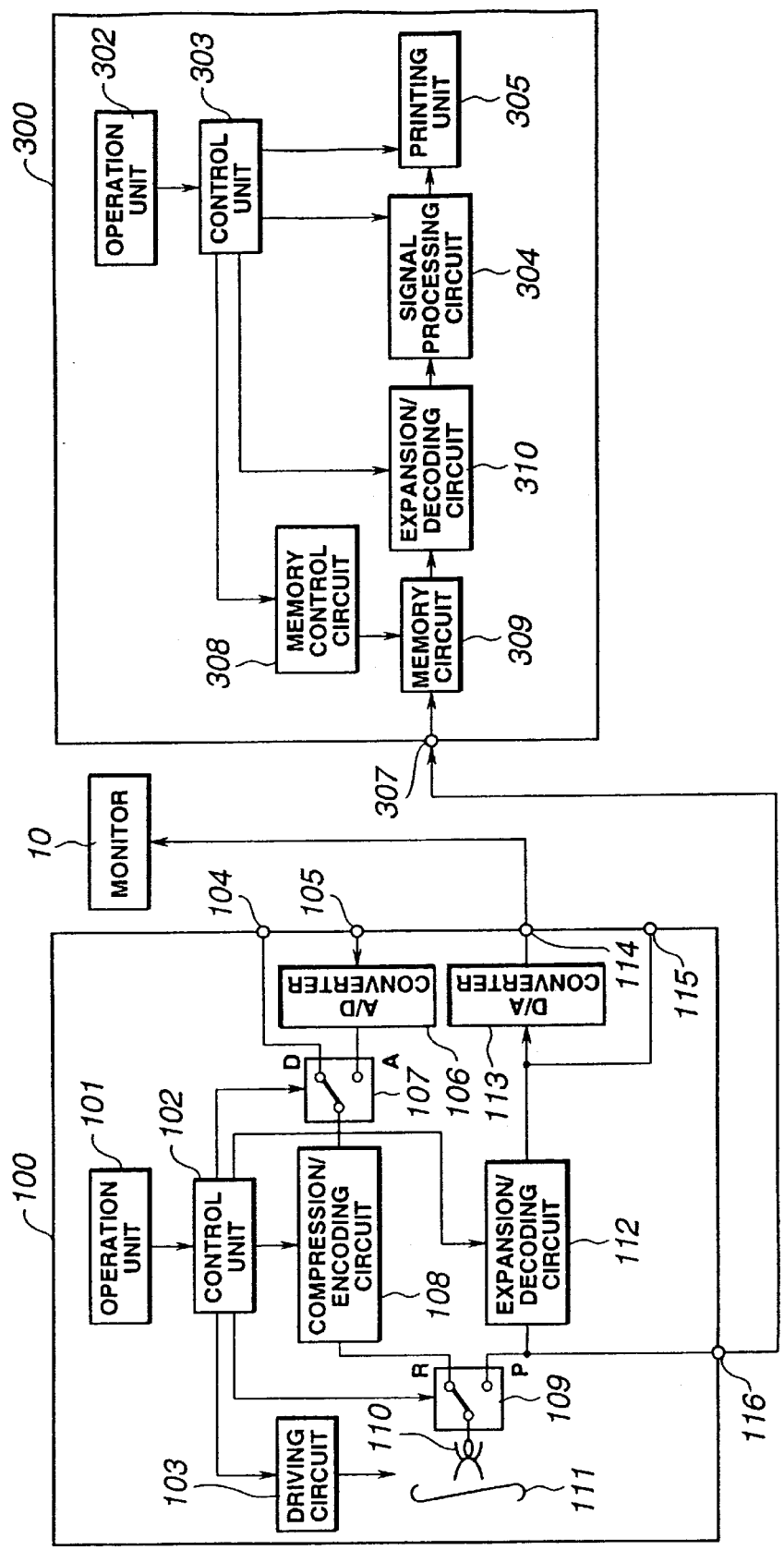
FIG. 12 is a block diagram illustrating the configuration of an image forming system according to a third embodiment of the present invention.

FIG. 12 is a block diagram illustrating the configuration of an image forming system according to a third embodiment of the present invention. Reference numerals used in FIG. 12 which are the same as those used in FIGS. 2 and 11 denote the same elements.

In FIG. 12, a compressed image signal output from an output terminal 116 of a VCR 100 is input to a memory circuit 309 via an input terminal 307. The memory circuit 309 has the same configuration as the memory circuit 207 in the second embodiment, and can store a compressed image signal representing 25 picture frames.

The operator instructs the apparatus to accept an image signal by operating an operation unit 302 when a picture frame to be printed has been reproduced while confirming the reproduced images displayed on a monitor 10. Upon reception of instruction to accept the image signal, a control unit 303 interrupts the writing of an image signal in memory circuit 309 by controlling a memory control circuit 308 as in the second embodiment.

Also in the third embodiment, an expansion/decoding circuit 310 performs the same operation as an expansion/decoding circuit 112 of the VCR 100. That is, upon completion of acceptance of the image signal in the memory circuit 309, the operator instructs sample printing through the operation unit 302, and selects the above-described two kinds of parameters for performing sample printing. Upon reception of the instruction for sample printing, the control unit 303 reads out the compressed and encoded image signal from the memory circuit 309. The read out compressed and encoded data is returned to its original state according to the above-described decoding processing by the expansion/decoding circuit 310, and is transmitted to a signal processing circuit 304.

Predetermined processing is performed by the signal processing circuit 304 and a printing operation is performed by a printing unit 305 according to the signal processing performed by the circuit 304 as in the second embodiment.

As described above, since in the present embodiment, a memory and an expansion/decoding circuit are provided in the main body of the printer, it is possible to directly input a reproduced image from the VCR 100 without passing through an I/F unit, and therefore it is possible to reduce the size of the entire system.

In the third embodiment, an expansion/decoding circuit is provided in the printer 300, and a compressed image signal is input from the VCR 100. However, as in the first embodiment, the apparatus may be configured such that a decoded image signal can be input.

In the above-described embodiments, only an image signal representing I-picture frames is used as an image signal for printing. However, when it is intended to select a picture frame with higher precision by shortening the interval between selectable picture frames, P-picture frames or B-picture frames may also be used.

Particularly when using even B-picture frames, it is possible to select a picture frame in units of a picture frame, i.e., in units of 1/30 second. In such a case, the memory circuit may be configured by only image memories.

In the foregoing embodiments, a description has been provided of the case in which a desired image is printed from a dynamic image signal reproduced from a digital VCR. However, the present invention is not limited to such a case; an image reproduced from any other recording medium, an image represented by an image signal received via a radio wave or the like, or an image photographed by a video camera or the like may also be printed.

As is apparent from the forgoing description, in the above-described embodiments, since an image signal representing a plurality of picture frames including an assigned picture frame are stored in a memory, and images of a plurality of picture frames corresponding to the stored image signal are recorded on a recording medium, it is possible to easily select an image which is most suitable for printing from among dynamic images.

Since an image signal stored in the memory is subjected to intraframe encoding, a high-definition image can be reproduced.

In the above-described embodiments, since image signals representing a plurality of picture frames processed with different parameter values are recorded on one recording medium, the appearance of images which have been actually printed with different parameter values can be easily confirmed. By selecting an image processed with desired parameter values, the picture quality can be easily adjusted.

The individual components designated by blocks in the drawings are all well known in the image forming apparatus and system arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
    supplying means for supplying moving image data including frames that have been selectively encoded as one of an intraframe encoded frame and an interframe encoded frame;
    output means for outputting moving images represented by the moving image data supplied by said supplying means;
    designating means for designating a desired image from among the moving images output by said output means;
    extraction means for extracting intraframe encoded frames from the moving image data supplied by said supplying means; and
    storage means for, in response to the designating by said designating means, storing an intraframe encoded frame corresponding to the designated desired image together with (i) intraframe encoded frames extracted from the moving image data within a predetermined time period before the desired image; and (ii) intraframe encoded frames extracted from the moving image data within a predetermined time period after the desired image.

2. An image processing apparatus according to claim 1, further comprising decoding means for decoding the image data supplied by said supplying means.

3. An image processing apparatus according to claim 1, further comprising recording means for recording images of a plurality of picture frames represented by the image data outputted by said output means on a recording medium and for reducing the size of each of the images.

4. An image processing apparatus according to claim 1, wherein said output means comprises means for outputting the intraframe encoded frames stored by said storage means so as to simultaneously display the intraframe encoded frames on a screen.

5. An image forming apparatus comprising:
    memory means for storing an intraframe encoded frame from moving image data;
    changing means for changing a parameter value of an intraframe encoded frame which is read out from said memory means;
    recording means for recording an image represented by the intraframe encode frame output from said changing means; and
    control means for controlling said changing means and said recording means so as to record a plurality of images so that the parameter value of each of the plurality of images is automatically changed by a predetermined amount with respect to a preceding image.

6. An image forming apparatus according to claim 5, wherein said changing means corrects the hue of the recorded image.

7. An image forming apparatus according to claim 6, further comprising selecting means for selecting a desired image from among the plurality of images recorded on the recording medium.

8. An image forming apparatus according to claim 7, wherein said control means reads out moving image data corresponding to the image selected by said selecting means from said memory means, and controls said recording means so as to record the image corresponding to the moving image data on the recording medium.

9. An image forming system comprising:
    a reproducing apparatus for reproducing moving image data selectively encoded using intraframe encoding and interframe encoding from a recording medium;
    an interface apparatus, comprising:
        first input means for inputting the moving image data reproduced by said reproducing apparatus;
        instructions means for instructing extraction of a desired image data from among the moving image data inputted by said first input means;
        extraction means for extracting image data from the moving image data inputted by said first input means which has been intraframe encoded in a predetermined time period in response to an instruction from said instruction means; and
        output means for outputting the image data extracted by said extraction means; and
    an image forming apparatus comprising:
        second input means for inputting the moving image data outputted by said output means;
        changing means for changing the density of an image of the moving image data which is input by said second input means;
        recording means for recording an image represented by the moving image data output from said changing means on a recording medium; and
        control means for controlling said changing means and said recording means so as to record a plurality of images represented by the moving image data which is changed by said changing means so that the density of each of the plurality of images is automatically changed by a predetermined amount with respect to a preceding image.

10. An image forming system according to claim 9, wherein moving image data reproduced by said reproducing apparatus is compressed image data.

11. An image forming system according to claim 10, wherein said reproducing apparatus comprises:
    expansion means for expanding the compressed moving image data; and
    output means for outputting the moving image data expanded by said expansion means.

12. An image forming system according to claim 10, wherein said reproducing apparatus comprises output means for outputting the compressed moving image data.

13. An image forming system according to claim 12, wherein said interface apparatus further comprises expansion means for expanding the compressed image data and supply means for supplying the expanded moving image data to said image forming apparatus.

14. An image forming system according to claim 12, wherein said image forming apparatus further comprises expansion means for expanding the compressed image data and said recording means records an image corresponding to the expanded moving image data on the one recording medium.

15. An image forming apparatus comprising:
    input means for inputting moving image data representing a plurality of picture frames;
    changing means for changing a parameter value of an intraframe encoded frame from the input moving image data;

recording means for recording an image represented by the intraframe encoded frame output from said changing means; and control means for controlling said changing means and said recording means so as to record a plurality of images on one recording medium so that the parameter value of each of the plurality of images is automatically changed by a predetermined amount with respect to an adjacent image.

16. An image processing method comprising the steps of:

supplying moving image data including frames that have been selectively encoded as one of an intraframe encoded frame and an interframe encoded frame;

outputting moving images represented by the moving image data supplied in said supplying step;

designating a desired image from among the moving images output in said outputting step;

extracting intraframe encoded frames from the moving image data supplied in said supplying step; and storing, in response to said designating step, an intraframe encoded frame corresponding to the desired image designated in said designating step together with (i) intraframe encoded frames extracted from the moving image data within a predetermined time period before the desired image and (ii) intraframe encoded frames extracted from the moving image data within a predetermined time period after the desired image.

17. An image processing method according to claim 16, wherein said outputting step comprises outputting the intraframe encoded frames stored by said storing step so as to simultaneously display the intraframe encoded frames on a screen.

18. An image forming method comprising the steps of:

inputting moving image data representing a plurality of picture frames;

changing a parameter value of an intraframe encoded frame from the input moving image data;

recording an image represented by the intraframe encoded frame output by said changing step; and controlling said changing and said recording steps so as to record a plurality of images on one recording medium so that the parameter value of each of the plurality of images is automatically changed by a predetermined amount with respect to an adjacent image.

19. An image forming method comprising the steps of:

reproducing moving image data selectively encoded using intraframe encoding and interframe encoding from a recording medium;

inputting the moving image data reproduced by said reproducing step;

instructing extraction of a desired image data from among the moving image data inputted by said inputting step;

extracting image data from the moving image data inputted by said inputting step which has been intraframe encoded in a predetermined time period in response to an instruction from said instructing step;

outputting the image data extracted by said extracting step;

inputting the moving image data outputted by said outputting step;

changing the density of an image of the moving image data which is inputted by said inputting step for inputting the moving image data outputted by said outputting step;

recording an image represented by the moving image data changed by said changing step on a recording medium; and controlling said changing step and said recording step so as to record a plurality of images on one recording medium so that the density of each of the plurality of images is automatically changed by a predetermined amount with respect to an adjacent image.

20. An image processing apparatus comprising:

input means for inputting moving image data composed of a plurality of pictures from a transmission path;

processing means for processing the input image data with a processing parameter value;

output means for outputting the image data so that a plurality of images are output corresponding to pictures represented by the image data processed by said processing means, said output means outputting the image data such that the processing parameter value for each of the plurality of images is different and such that each of the plurality of images is output to a common screen;

selecting means for selecting a first image, to be output, from among the plurality of images output by said output means and for selecting a second image, having a desired processing parameter value, from among the plurality of images by said output means; and setting means for setting the processing parameter value of said processing means to the processing parameter value of the second image selected by said selecting means.

21. An apparatus according to claim 20, wherein said output means comprises image forming means for forming the images represented by the image data processed by said processing means on a recording medium.

22. An apparatus according to claim 21, wherein said image forming means forms the plurality of pictures on a single recording medium.

23. An apparatus according to claim 21, wherein said image forming means forms the images represented by the image data processed by said processing means with the processing parameter value set by said setting means.

24. An apparatus according to claim 20, wherein each of the plurality of pictures represents a different image.

25. An apparatus according to claim 20, wherein the input image data are coded by selectively using an intra-picture coding method and an inter-picture coding method.

26. An apparatus according to claim 25, wherein said processing means comprises extraction means for extracting the intra-picture coded image data from the input image data and storing means for storing the extracted image data, the plurality of pictures being represented by the image data stored in said storing means.

27. An image processing apparatus comprising:

reading means for reading image data of a plurality of pictures from a storage device;

processing means for processing the image data with a processing parameter value;

output means for outputting the image data so that a plurality of images are output corresponding to pictures represented by the image data processed by said processing means, said output means outputting the image data such that the processing parameter value for each of the plurality of images is different and such that each of the plurality of images is output to a common screen;

selecting means for selecting a first image, to be output, from among the plurality of images output by said output means and for selecting a second image, having a desired processing parameter value, from among the plurality of images output by said output means; and setting means for setting the processing parameter value of said processing means to the processing parameter value of the second image selected by said selecting means.

28. An image processing apparatus comprising:

input means for inputting moving image data including frames that have been selectively encoded as one of an intraframe encoded frame and an interframe encoded frame;

changing means for changing a parameter value of the intraframe encoded frame in the input moving image data;

output means for outputting image data of the intraframe encoded frame output from said changing means; and control means for controlling said changing means and said output means so that a plurality of images represented by the image data of the intraframe encoded frame are shown on one screen and that the parameter value of each of the plurality of images is automatically changed by a predetermined amount with respect to an adjacent image.

29. An apparatus according to claim 28, further comprising:

selecting means for selecting a desired image, from the plurality of images shown on one screen, having a desired parameter value; and setting means for setting the parameter value of the intraframe encoded frame to the parameter value of the selected image selected by said selecting means.

30. An apparatus according to claim 28, further comprising:

decoding means for decoding the input moving image data, said changing means changes the parameter value of decoded image data corresponding to the intraframe encoded frame in the decoded moving image data.

31. An apparatus according to claim 28, wherein said changing means changes the hue of the intraframe encoded frame.

32. An apparatus according to claim 28, wherein the input moving image data have been encoded according to MPEG system.

33. An image processing apparatus for decoding moving image data including frames that have been selectively encoded as one of an intraframe encoded frame and an interframe encoded frame by a decoding unit and outputting the decoded image data by an output unit, said apparatus changing a parameter value of decoded image data of the intraframe encoded frame in the decoded moving image data and outputting decoded image data of the intraframe encoded frame so that a plurality of images of the intraframe encoded frames are shown on one screen and that a parameter value of each of the plurality of images of the intraframe encoded frames is automatically changed by a predetermined amount with respect to an adjacent image.

34. An apparatus according to claim 33, wherein a desire image, having a desired parameter value, is selected from the plurality of images shown on one screen, and said apparatus sets the parameter value of the intraframe encoded frame to the parameter value of the selected image.

35. An apparatus according to claim 33, wherein the hue of the intraframe encoded frame is changed.

36. An apparatus according to claim 33, wherein the input moving image data have been encoded according to MPEG system.

37. An apparatus according to claim 33, wherein said apparatus receiving the moving image data reproduced by a reproducing device.

38. An apparatus according to claim 33, wherein the image data of the intraframe encoded frame are extracted and stored in a storage unit, said apparatus outputting the image data of the extracted intraframe encoded frame.

* * * * *

UNITED STATES PATENT AND TRADEMARK OFFICE
CERTIFICATE OF CORRECTION

PATENT NO. : 6,205,287 B1
DATED : March 20, 2001
INVENTOR(S) : Koji Takahashi et al.

Page 1 of 1

It is certified that error appears in the above-identified patent and that said Letters Patent is hereby corrected as shown below:

Column 1,
Line 33, "1005" should read -- 1105 --.

Column 4,
Line 34, "of I," should read -- of I-, --.
Line 39, "frame" should read -- frames --.

Column 5,
Line 43, "signal" should read -- signals --.

Column 9,
Line 2, "if" should read -- is --.
Line 12, "macrob-" should read -- macro --.
Line 13, "lock" should read --block --.

Column 11,
Line 23, "-cods" should read -- -codes --.
Line 48, "702" should read -- 703 --.

Column 16,
Line 12, "instructions" should read -- instruction --.

Signed and Sealed this

Twenty-second Day of January, 2002

Attest:

*Attesting Officer*

JAMES E. ROGAN
*Director of the United States Patent and Trademark Office*